Dec. 10, 1935.  W. M. NECKERMAN  2,023,897
APPARATUS FOR MANUFACTURING ELECTRICALLY WELDED TUBING
Filed July 9, 1931   12 Sheets-Sheet 1
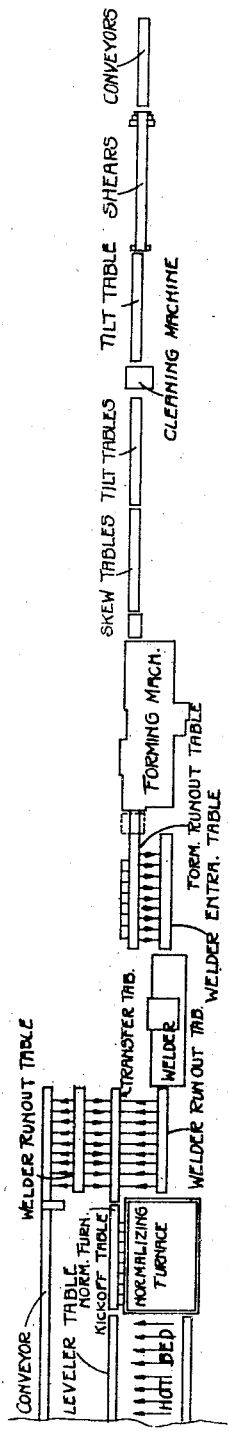
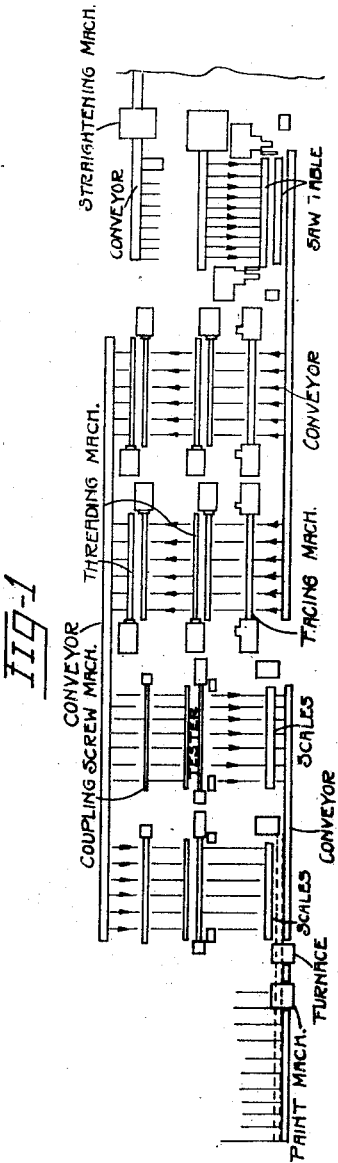
Inventor
WILLIAM M. NECKERMAN

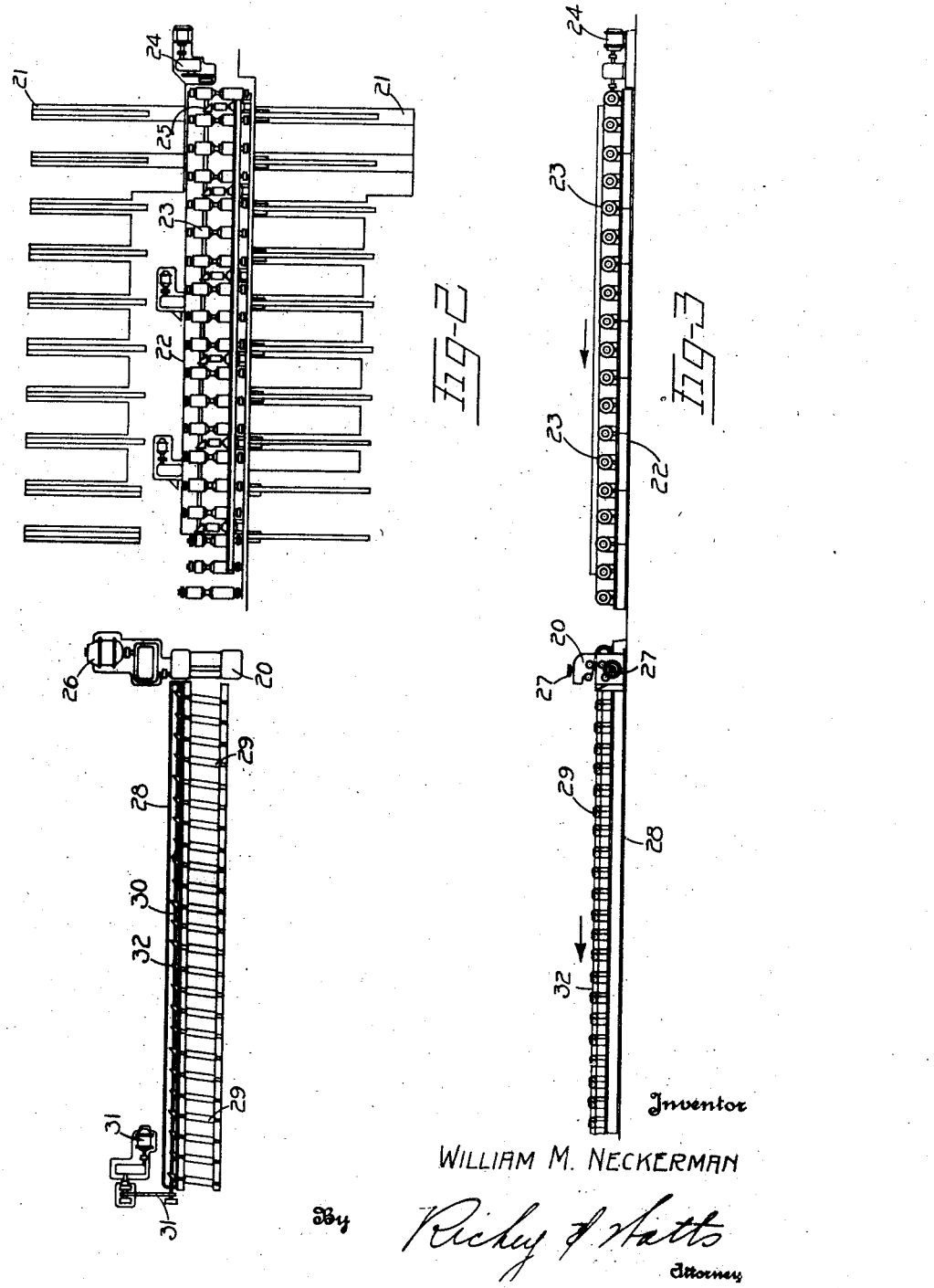

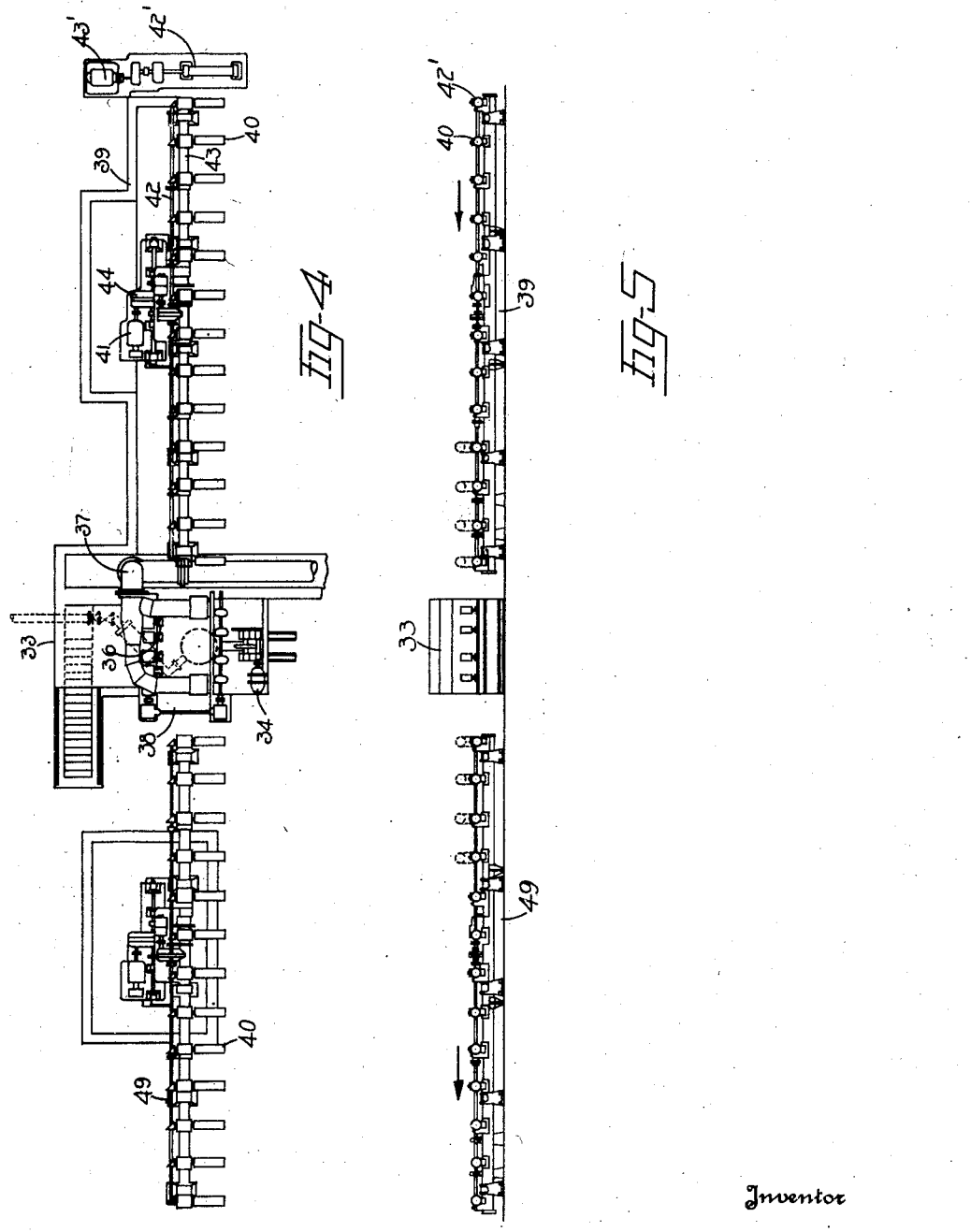

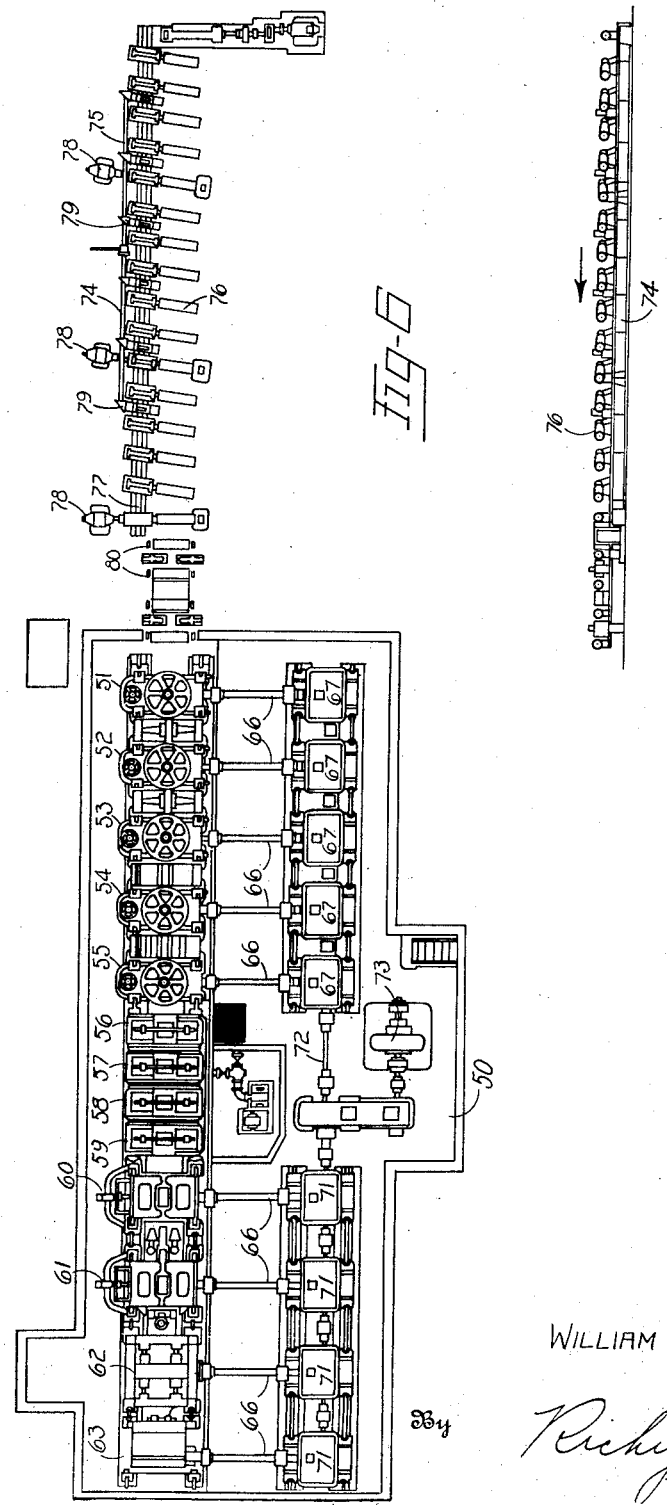

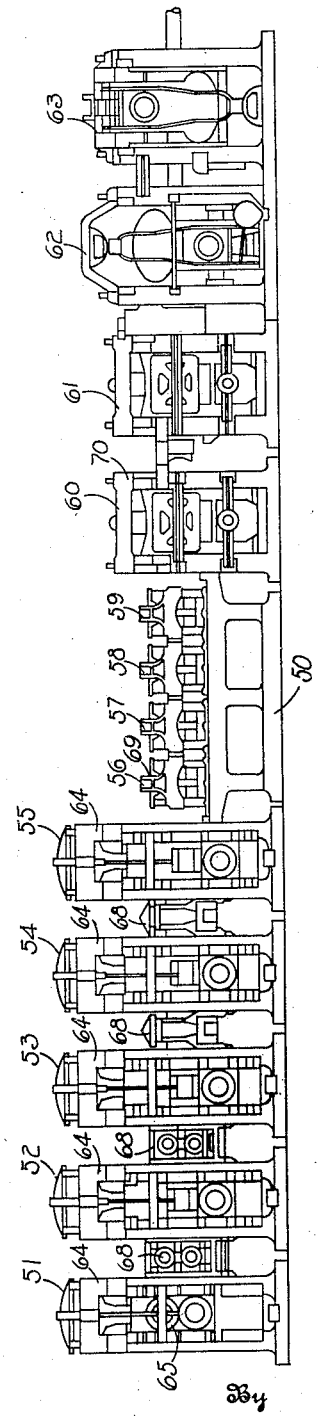

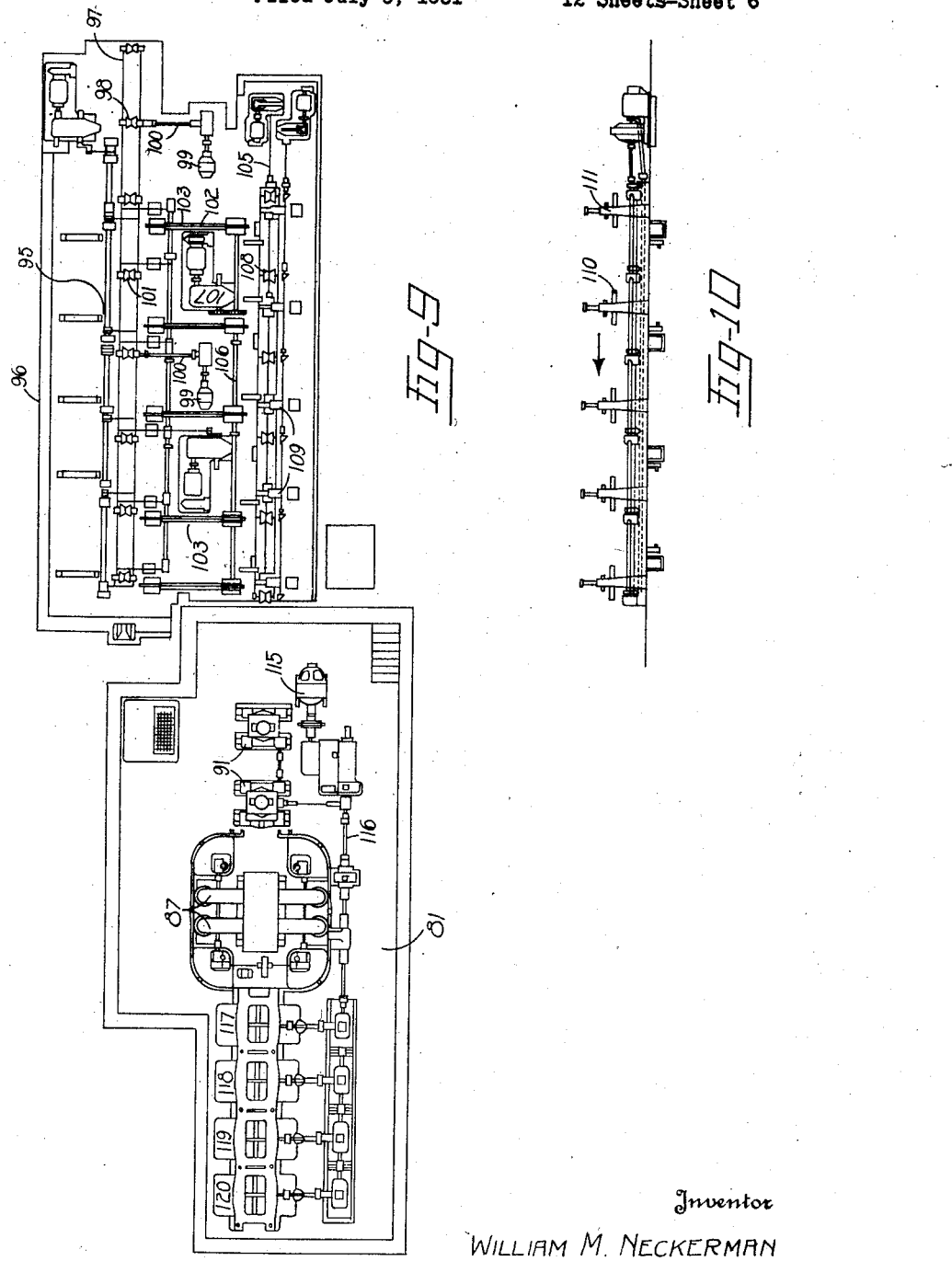

Dec. 10, 1935.    W. M. NECKERMAN    2,023,897
APPARATUS FOR MANUFACTURING ELECTRICALLY WELDED TUBING
Filed July 9, 1931    12 Sheets-Sheet 7
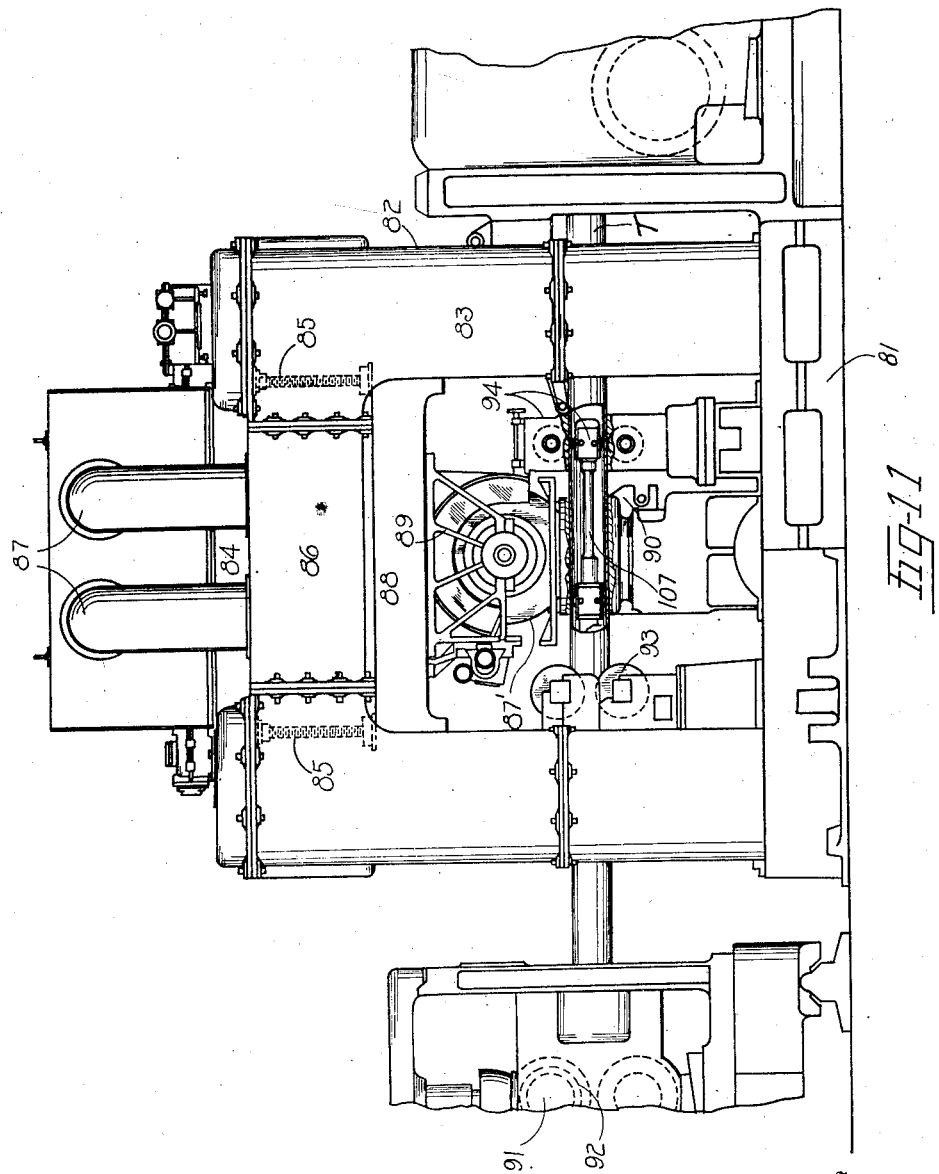
Inventor
WILLIAM M. NECKERMAN
By Richey & Watts
Attorney

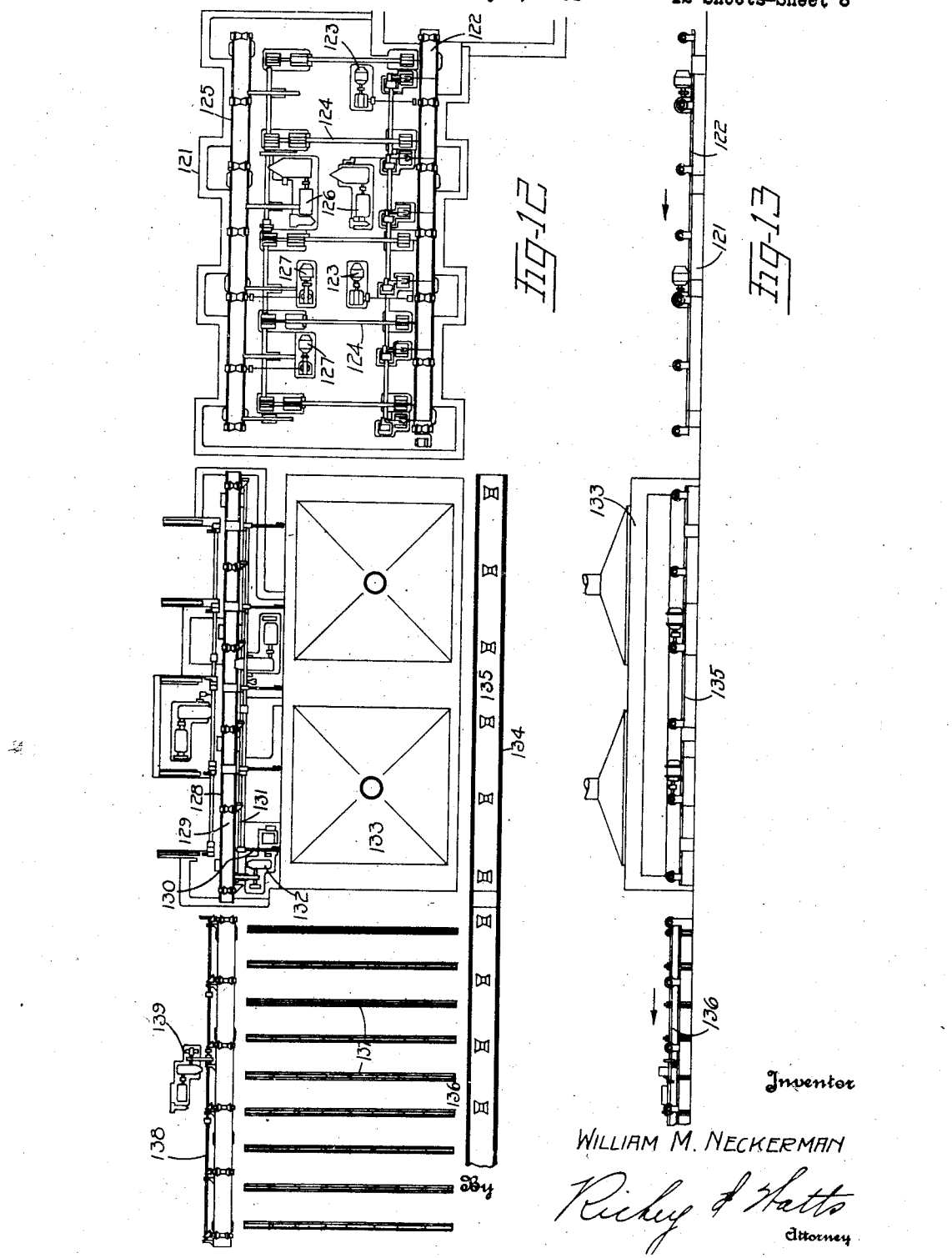

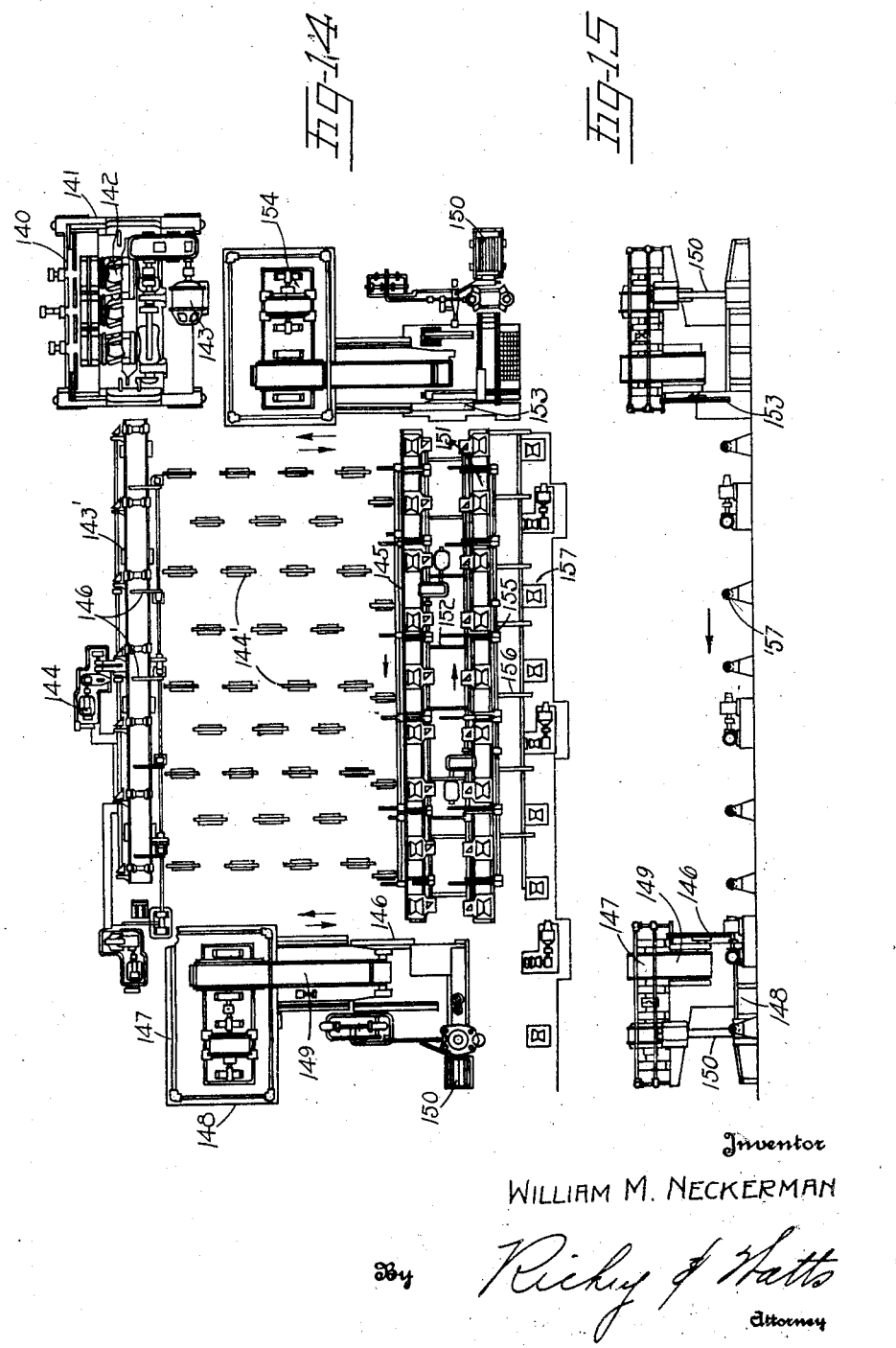

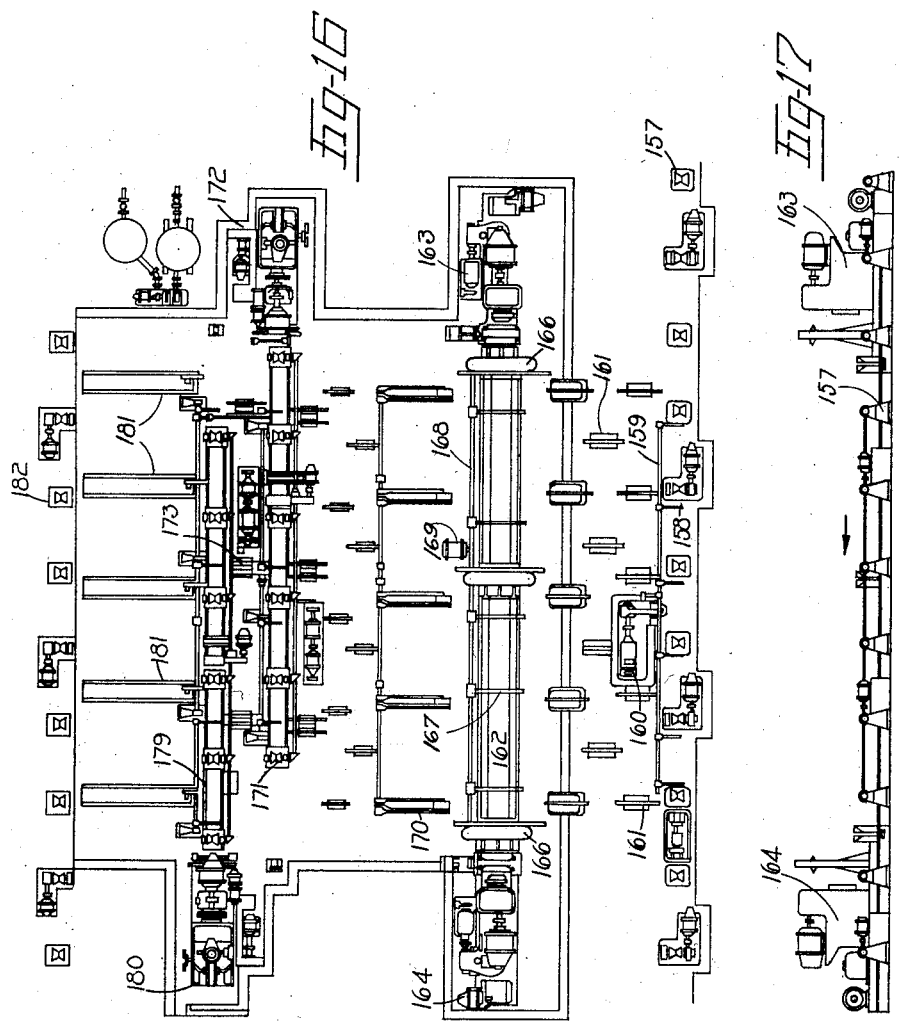

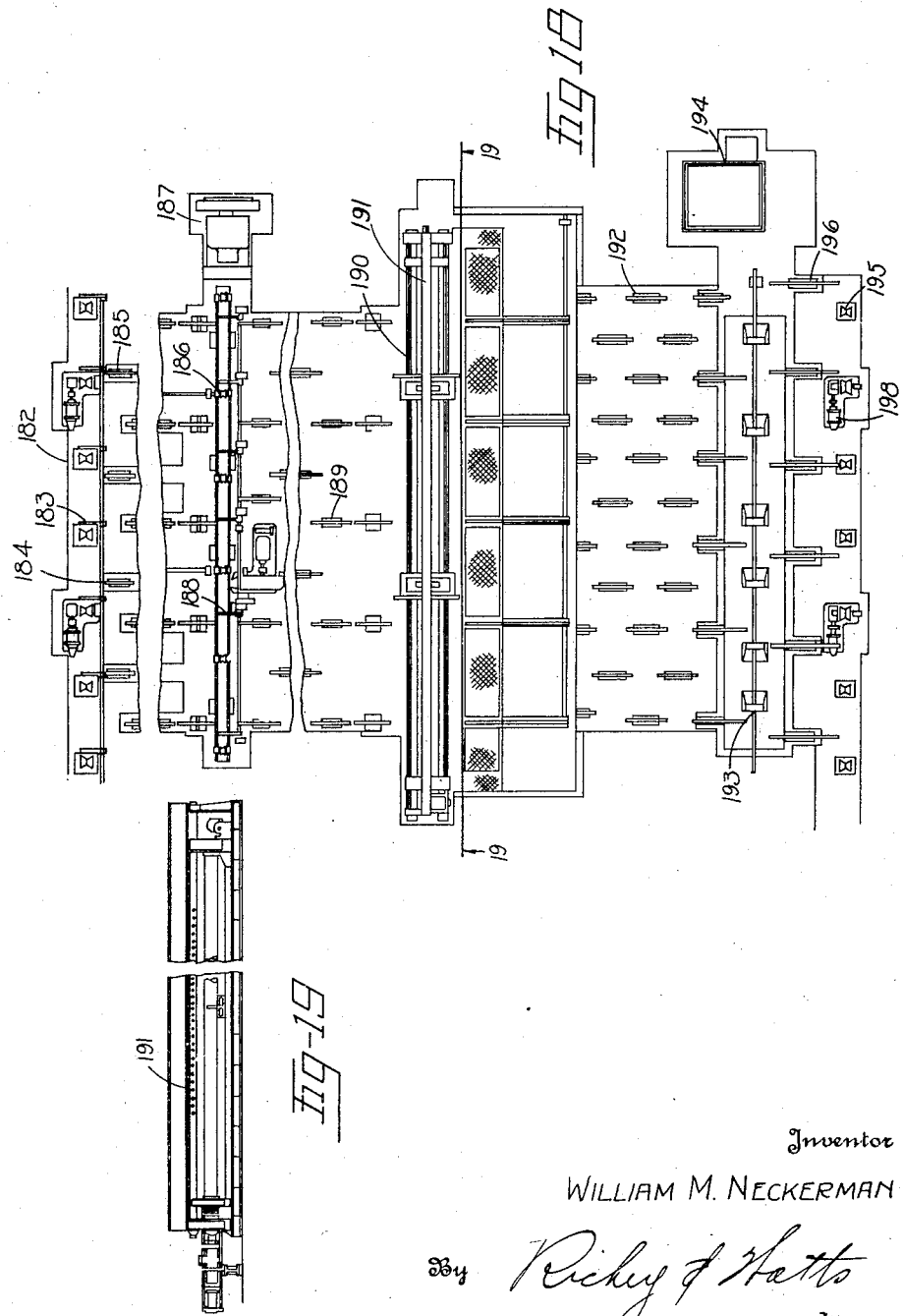

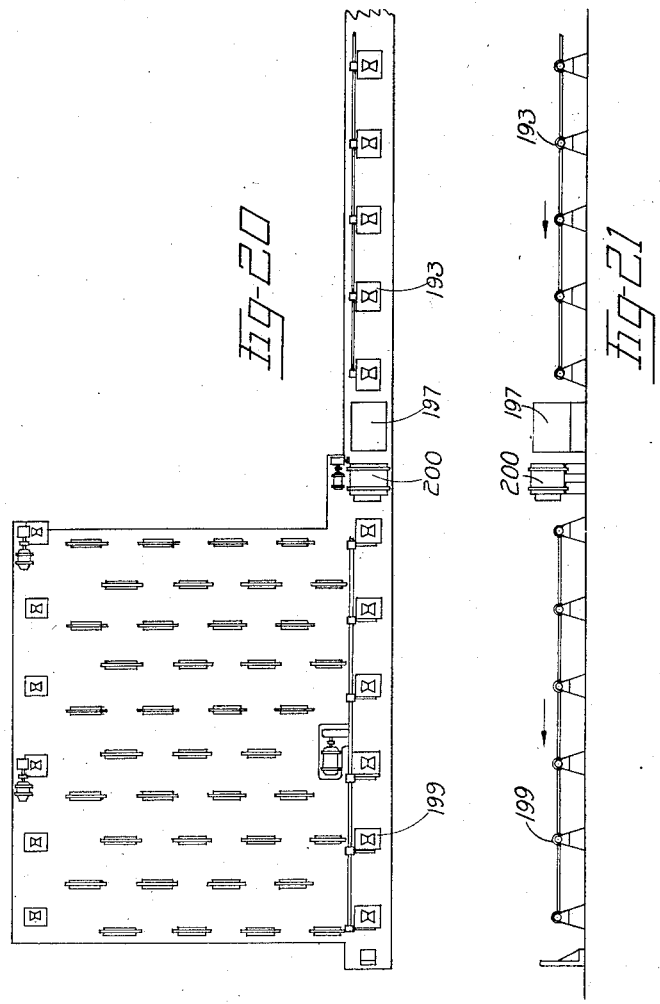

Patented Dec. 10, 1935

2,023,897

UNITED STATES PATENT OFFICE 2,023,897

APPARATUS FOR MANUFACTURING ELECTRICALLY WELDED TUBING

William M. Neckerman, Youngstown, Ohio, assignor to Republic Steel Corporation, a corporation of New Jersey Application July 9, 1931, Serial No. 549,590

3 Claims. (Cl. 219—6)

This invention relates to electric weld pipe and to a process and apparatus for making the same. It relates more particularly to the continuous manufacture of electrically welded pipe of large diameters and of heavy gauge material by the electric resistance method.

It is among the objects of this invention, therefore, to provide a process for the continuous manufacture of electrically welded pipe of large diameters from heavy gauge flat rolled metal wherein the process by which the flat form rolled metal passes from a flat to the finished pipe is substantially continuous. It is a further object of this invention to provide a pipe mill embodying apparatus which co-operate each with the other and each constitute a step in the process of forming a pipe from a flat plate. It is a further object to provide an electrically welded pipe of heavy gauge material by the electrical resistance methods of welding.

This invention is directed to a mill which is effective in carrying out the various steps in the process of manufacturing heavy gauge pipe by the electric resistance methods of welding.

Another object is to provide an apparatus for the handling of flat rolled metal during that period when the flat rolled metal is subjected to such operations as will result in the finished article, without the necessity of manual or overhead handling.

Toward this end the process contemplates various steps and requires for its successful operation apparatus which is adapted to handle as well as operate on the flat rolled metal. This process is briefly as follows:

Starting with flat rolled cold ferrous metal, it is first subjected to a plurality of rotary shears where the edges are trimmed and the metal is reduced to the required width necessary for forming pipe of the desired diameter. From this shearing machine the flat rolled metal passes into a cleaning machine where the edges thereof are thoroughly cleaned by a cleaning process. The metal is then automatically conveyed to a forming apparatus wherein the metal is continuously and progressively shaped from a flat to a tubular form. The forming or bending is accomplished while the metal is moving with relation to the forming means and at a substantially uniform speed, and results in a straight blank which is substantially free from excessive and non-uniform stresses or strains, and which is elongated more or less equally, if at all. Hence, there is no loss or expenditure of power by reason of repeatedly starting and stopping the movement of the metal. From the forming machine the seam of the formed pipe is passed under the electrodes of a suitable welding machine in such a manner as to form a perfect weld.

Co-operating with the welding apparatus is a plurality of sizing rolls which are effective to impart a perfect cylindrical shape to the pipe. From the sizing rolls the pipe passes through an annealing furnace, in the case of high carbon steel, to relieve any excessive stresses which might have been set up in the pipe during the forming, welding and sizing operations. This step is especially advantageous only with high carbon steel, for the reason that the forming machine is so constructed that in low carbon metal there are relatively few, if any, stresses set up in the walls of the completed pipe of a magnitude which makes annealing desirable. Such stresses as are imparted to the pipe throughout its length are equalized or relieved wholly or in part in the annealing furnace and are rendered ineffective to cause inferior pipe. From the annealing furnace the pipe passes over a cooling bed to reduce it to such temperature that it may be acted upon by a straightening machine. Following the straightening machine the successive steps of cropping the ends of the pipe, facing and threading the same are next in order. From this point the pipe is conveyed to a testing machine, where it undergoes a rigid hydrostatic test and is then dried, painted and is ready for commercial use.

Other objects of the invention, not at this time more particularly enumerated, will become more apparent as the nature of the invention is better understood from the following detailed description of a novel method embodying my invention, a new product and the novel construction, combination and arrangement of parts is shown in the accompanying sheets of drawings in which:

Figure 1 is a diagrammatic view illustrating the steps and apparatus preferably employed with the present invention.

Figure 2 is a top plan view of a portion of the apparatus employed and showing a plurality of skids adjacent the forward end of the conveyor system upon which the flat rolled metal is stored, coupled with the shearing device for trimming the edges of the metal.

Figure 3 is a side elevation of that portion of the conveyor system and its associated parts shown in Figure 2.

Figure 4 is a top plan view of a portion of the conveyor system illustrating a pair of tilt tables having a cleaning machine interposed therebetween.

Figure 5 is a side elevation of the showing made in Figure 4.

Figure 6 is a top plan view of another portion of the conveyor system showing a forming apparatus employed in connection with the present invention and showing an aligning apparatus in the form of a skew table for feeding the flat rolled metal to the forming apparatus.

Figure 7 is a side elevation of the skew table shown in Figure 6.

Figure 8 is a side elevation of the forming apparatus shown in Figure 7.

Figure 9 is a top plan view of another portion of the system showing a welding machine employed in connection with the present invention and showing a run-out table leading from a previous process, an aligning table for the welding machine and a transfer apparatus for moving the formed pipe from the former table to the latter.

Figure 10 is a side elevation of the run-out and aligning tables and the transfer apparatus shown in Figure 9.

Figure 11 is a side elevation of the actual welding apparatus employed in connection with the present invention.

Figure 12 is a top plan view of a normalizing furnace which comprises an alternative process that may be employed and showing a cooling bed associated therewith together with auxiliary apparatus for conducting the welded pipe to the furnace.

Figure 13 is a side elevation of the apparatus shown in Figure 12.

Figure 14 is a top plan view of that portion of the conveyor system which utilizes a straightening machine for receiving the pipe from the normalizing process and a saw apparatus for removing the end sections of the welded pipe.

Figure 15 is a side elevation of the saw apparatus shown in Figure 14.

Figure 16 is a top plan view of a facing machine and of a threading machine in the conveyor system and showing their auxiliary handling mechanisms.

Figure 17 is a side elevation of the apparatus shown in Figure 16.

Figure 18 is a top plan view of a coupling applying machine, a hydraulic testing machine and a weighing machine or scales, all operatively embodied as a fragmentary portion of the conveyor system.

Figure 19 is a sectional view taken along the line 19—19 of Figure 18.

Figure 20 is a top plan view of a drying apparatus and of a painting machine operatively associated with the conveyor system and representing the last process in the method of manufacturing the pipe.

Figure 21 is a side elevation of the apparatus disclosed in Figure 20.

In all the above described views like characters of reference are employed to designate like parts throughout, and the apparatus disclosed for carrying out the method involved is shown diagrammatically, sufficient detail, however, being present to facilitate a complete understanding of each process and the manner in which it is conducted.

Generally speaking, the method employed consists in conducting separate sheets of flat rolled preferably cold metal successively through a number of steps which prepare and form or shape the flat rolled metal into a cylindrical form, weld the seam and treat the welded pipes so that they emerge from the last process in finished marketable condition.

The apparatus shown herein and constituting one embodiment of the present invention consists of instrumentalities for carrying out the various steps of the process and conveyor and handling means for moving the metal in approximately one horizontal plane a small distance above the floor to and from the various instrumentalities. This apparatus is so assembled that substantially straight line production is obtained and by utilizing certain parts of the conveyor and handling means for temporary storage space substantially continuous operation of the various instrumentalities or of the mill as a whole may be had, altho certain operations may be carried out more rapidly than others and altho certain instrumentalities may be temporarily idle while others are in operation. Considerable economies result from the preferred apparatus and its arrangement. The various instrumentalities illustrated include a shearing machine for trimming the sides of the sheets to insure uniformity in cross section of the finished articles, a cleaning machine for preparing by abrasion the surfaces to be welded and to be engaged by the welding electrodes, a multiple stage forming machine for shaping the flat sheets into cylindrical form, a welding machine for joining the longitudinal edges of the sheets at the seam, a sizing unit for shaping the welded pipe into cylindrical shape and the approximately desired diameter seam, a normalizing furnace for permitting minor deformities caused by stresses in the formed pipes and existing stresses themselves which are accompanied by any deformities to be assimilated and distributed and consequently relieved, a cooling apparatus in the form of a hot bed, a straightening machine, a sawing machine for removing end sections of welded pipe, a testing apparatus for such sections, a machine for facing the pipe ends, a threading machine, a coupling machine for applying a coupling member to an end of each pipe, a hydrostatic testing machine for testing the pipe, a weighing machine for establishing the relative value of each pipe, a drying furnace for removing the effects of the hydrostatic testing machine, and a paint machine.

Each of these instrumentalities and the conveyor and handling means associated therewith will be described hereinafter in sufficient detail for those skilled in the art to understand and be able to practice the same.

As each department of the invention is set forth, that portion of the conveyor system and handling apparatus with which it is directly associated will be briefly described.

*The shearing machine—Figures 1, 2 and 3*

The shearing machine proper is designated at 20 and is provided for the purpose of trimming the edges of the flat rolled metal preparatory to the cleaning and forming operation. The material, which has previously been formed in the rolling mill into flat elongated sheets of metal, is piled on suitable racks 21 on opposite sides of a conveyor system and at one end of the same. These racks serve as a cooling bed for the hot metal as it is delivered from the mills. The conveyor system includes a run-in table for the shearing machine. This table consists of a frame work 22 having mounted thereon a plurality of power driven rollers 23 suitably driven by electric motor 24 by means of a suitable gearing arrangement 25. The flat rolled metal is removed from 64 having forming rolls 65 operatively mounted therein and driven through suitable spindles 66 by drive units 67. Disposed between each of these driven passes and the next adjacent driven pass is a holding pass 68. These holding passes are provided for the purpose of holding or setting the metal after it comes from the preceding driven pass and until it is received by the subsequent pass.

From the last pass 55, of the series of passes just described, the metal passes into idler passes, 56, 57, 58 and 59. These idler passes consist of a frame work 69 having therein a plurality of rolls which contact with the metal on both sides thereof in each pass. From the last idler pass 59, the metal is conducted into the passes 60, 61, 62 and 63 which are also driven passes. The passes 61 and 60 each consists in a frame work 70 in which there is disposed both inside and outside rolls (not shown), which former rolls support the inside of the pipe being formed against the comparatively great pressure exerted by the outside forming rolls. The final passes 62 and 63 cause the metal to assume its final tubular shape, although when the pipe leaves these passes the seam remains open a limited amount due to the resiliency of the metal. The driven passes 60, 61, 62 and 63 are each driven by a driving unit 71. The driving units 67 and the driving units 71 are connected in series from a central driving shaft 72, driven from a motor 73 disposed upon the foundation 50.

The forming machine just described has associated therewith a skew table forming a part of the conveyor system. This skew table is designated at 74 and is adapted to receive the metal as it leaves the tilt table 49, having been cleaned by the cleaning machine 33. This skew table 74 consists in a frame work 75 having mounted thereon horizontal conveyor rolls 76 driven in series from a longitudinal shaft 77, in turn driven by a motor 78. These line-up rolls are disposed at a slight angle to the transverse axis of the table and serve to propel the metal forwardly to the forming machine while holding one marginal edge of the same against a plurality of aligning stops 79. Leaving the skew table 74 the metal is engaged by a pair of pinch rolls 80 of conventional design which guide the material into the forming machine to be acted upon as described above.

In carrying out the forming process the metal is continually formed by the passes above described into substantially cylindrical shape from a flat form. While changing from flat to substantially cylindrical form the metal is caused to flow smoothly without abrupt deformation. The passes are disposed closely enough together so that the metal is held in bent form and is prevented from following any tendency which it might ordinarily have to spring back to a curvature of greater radius before it has become set beyond its elastic limit. Each pass carries the metal just sufficiently beyond its elastic limit that the desired transition from flat to tubular form is obtained.

The bending does not set up stresses or strains in the metal which are unequal or non-uniform to a serious degree and does not elongate any part of the metal materially more than another part. The formed pipe thus has substantially square ends, is nearly straight, and contains no unrelieved stresses which are strong enough to weaken, damage or otherwise injure the weld as by causing twisting or bending of the welded pipe.

It will be noted that the conveyor and handling apparatus delivers the clean plate metal to the forming machine in about the same horizontal plane as that in which the plate has heretofore been moved, and also that the formed pipe is received from the former by the conveyor and handling apparatus somewhat below that horizontal plane for delivery in approximately that plane to the welding machine. This portion of the conveyor and handling apparatus is sufficiently large to act as a temporary storage space for formed but unwelded pipe, thereby permitting operation of the forming machine while the welder is idle for a time or vice versa.

*The welding and sizing machine, Figures 9, 10 and 11*

The welding machine is best shown in Figure 11 and forms the subject matter of the co-pending application filed July 15, 1931 by Herman G. Blevins and bearing Serial No. 550,906 for Method and apparatus for electrically welding pipe, now Patent No. 1,982,415 and Frank W. Cramer Serial No. 576,260 filed November 20, 1931 now Patent No. 2,016,414.

Referring to Figure 11 a foundation 81 serves to support a frame 82 including columns 83. A crosshead 84 is adjustably carried by the columns 83 by means of threaded adjusting rods 85. A transformer 86, provided with cooling ducts 87, is carried on the crosshead 84 and serves to supply welding current to the electrodes 87' which are suspended from a carriage 88. The electrodes 87' are journalled in bearing brackets 89 secured to the carriage 88. The electrode rolls 87' are supported directly above a plurality of pressure rolls 90 which serve to support the open seam pipes thereon. A plurality of line-up rolls 91 (Figures 9 and 11) are provided forwardly of the machine for driving the formed pipes into the machine to be welded. These line-up rolls are conventional in their design and the upper roll of each pair of line-up rolls is provided with a fin 92 which extends into the open seam in the pipe and serves to align the same with the electrode rolls 87'. A stand of feed rolls 93 is provided forwardly of the electrode rolls, which engages the pipe and drives the same through the unit. Rearwardly of the electrode rolls are a plurality of planishing rolls 94 which act on the inside of the welded pipe and on the outside of the same to work on the flash formed on the pipe during the welding operation. These planishing rolls iron the flash of the seam down. The internal rolls of the planishing unit, 94 are carried on a mandrel 107 which is supported on the feed roll stand. The mandrel is supported from the housing of the line-up rolls by means of a plate (not shown) which extends through the open seam of the pipe.

Associated with the conveyor system and with the welding machine is a handling unit. This unit is also associated with the forming machine shown in Figure 9 and described above. This handling apparatus comprises a frame work 96 including a rack 95 for pipes that are rejected as being imperfectly formed by the forming machine. A run-out conveyor 97 receives the formed pipes from the forming machine. This conveyor consists in a plurality of hyperbolic rolls 98, certain of which rolls are driven through a plurality of shafts 100 which are each associated with separate motors 99 and others either of the racks 21 and placed upon the run-in table 22 by any suitable handling apparatus which is not shown, but which may, for example, be an electro-magnet operatively mounted upon a crane-hoist. The flat rolled metal is placed lengthwise on the table 22 and is moved forwardly and is fed into the shearing machine 20.

Upon passing through the shearing machine 20 the edges of the flat rolled metal are trimmed to the required width to produce pipe of a specific diameter. It is, of course, desirable that the longitudinal edges of the metal be trimmed by the shearing machine 20 so that the same are substantially straight, but this feature is subservient to the maintenance of a strict parallelism of these edges. Where the edges of the flat rolled metal deviate from a straight line, if parallelism is maintained, upon rolling of the flat rolled metal to substantially tubular form, the abutting edges at the seam will coincide.

The shearing machine 20 is of standard design and is provided with an electric motor 26 for driving the same. The usual circular cutting rolls are made adjustable by means of hand wheels 27.

A run-out table 28 is provided for the shearing machine. This run-out table is a part of the conveyor system and includes a frame work upon which there is mounted a plurality of horizontal rolls 29 suitably driven by a longitudinal drive shaft 30 having a driving connection with a motor 31. Marginal guides 32 are provided along one side of the table and the rolls 29 are inclined at a slight angle to a transverse axis of the table to maintain one edge of the trimmed flat rolled metal abutting against the guides 32 to properly align the metal upon the table 28, which is in the form of a skew table.

*The cleaning machine, Figures 4 and 5*

The cleaning machine assembly is designated in its entirety by the reference numerals 33 and consists in a suitable foundation upon which are mounted the operative elements of the machine. The machine employs a motor 34 for driving the same, and among other things has associated therewith a compressor (not shown) and blasting nozzles 36 together with an exhaust 37. The machine is of the sand blasting type but in the present process is adapted to employ cast iron shot to clean and prepare the edges of the flat rolled metal for welding. The machine employs cast iron shot as an abradant instead of sand on account of the deleterious effect of silica on the metal. It has been found that in the subsequent welding process an efficient weld can not always be effected where sand has been employed in the cleaning machine as an abradant. It is believed that the reason for this is that the silicaceous material which adheres to the metal, being an insulating material, will cause arcing at the electrodes. Where cast iron shot is employed, the lack of adhesion of the cast iron particles permits complete removal of the abradant before the flat rolled metal reaches the welding machine. The shot and removed scale may be carried to a separator (not shown) and be cleaned for use again.

The cleaning machine 33 is provided with an inclined table 38 across which the flat rolled metal is adapted to travel to receive the blast. In order that the metal may be fed onto this table in an inclined position a tilt table 39 is positioned in the conveyor system ahead of the cleaning machine. This tilt table is provided with a plurality of normally horizontal rolls 40 adapted to be rotated by means of an electric motor 41 connected to these rolls by suitable gearing 42. A pair of pinch rolls 42' driven by a motor 43' serves to feed the metal at a definite rate of speed onto the tilt table. The rolls 40 are carried by a rocking shaft 43 capable of being rocked by means of a motor 44. When the metal is brought onto the table 39 so as to occupy a position completely within the confines of this table the rolls 40 are partially revolved about the shaft 43 while still rotating. When these rolls 40 have assumed an inclination of approximately 45 degrees to the horizontal they remain in this tilted position while the flat rolled metal is being sent into the cleaning machine 33. After the edges, of the metal are cleaned the metal is run onto a second tilt table 49 similar to the table 39. The rolls 40 of this table normally occupy an inclined position commensurate with the inclination of the metal passing through the cleaning machine. When this table has received a piece of flat rolled metal, which has been cleaned, thereon, the rolls 40 are caused to assume a horizontal position and thus the metal as it passes from this table is restored to its normal horizontal position.

The cleaning machine 33 is so designed that it will operate upon the longitudinal edges of the flat rolled metal on both sides at the same time a substantial distance inwardly thereof to effectively clean an area or band at opposite sides of the metal to prepare the same for the subsequent welding operation. The width of the portions cleaned by the cleaning machine 33 is naturally in excess of the width of the electrodes in the welding machine to insure effective electrical contact of the welding machine electrodes during the subsequent welding operation.

It will be noted that the conveyor and handling apparatus thus far described moves the metal in substantially the same horizontal plane located a short distance above the floor from in front of the shear to beyond the cleaner, and that the horizontal sheared metal plate is tilted, passed thru the cleaner and caught on the other side by the conveyor and handling apparatus, all in a tilted position, and then is restored to the aforesaid position in a horizontal plane. The tilting permits cleaning of the under surface of the plate along its edges where the electrodes will later contact.

*The forming apparatus, Figures 6, 7 and 8*

The forming apparatus employed in connection with the present invention is preferably of the type shown in the co-pending application of Lawrence H. Park, Serial No. 565,007 filed Sept. 25, 1931 for Method of forming pipe, now Patent No. 2,012,795.

The machine (Figures 8 and 6) consists of a suitable foundation 50 having mounted thereon a plurality of pipe forming units or roll passes. These pipe forming units are mounted successively along the conveyor system and are designated at 51, 52, 53, 54, 55, 56, 57, 58, 60, 61, 62 and 63 respectively in the order upon which they receive the metal to be formed. The unit 51 is in the form of a stand of pinch rolls which is effective in aligning the metal and maintaining a predetermined rate of speed at which the metal moves through the forming mill. The units 52, 53, 54 and 55 comprise driven passes for receiving the metal and forming the same. These units are described in detail in the above mentioned application and each consists briefly in a housing of which, designated at 101, are idler rolls. A plurality of belt or chain conveyors 102, driven in any suitable manner from a longitudinal shaft 106, extends laterally of the frame 96. These are provided with lugs 103 for engaging the pipes when they have been placed thereon after being automatically ejected from the conveyor 97 to transport the same laterally to a conveyor 105. The lateral conveyor 102 is driven by a suitable motor 107. The conveyor 105 is similar to the conveyor 97 and is employed as a run-in conveyor for the welding machine. This conveyor 105 is in substantial alignment with the line-up rolls 91 and serves to feed the pipes to these latter rolls.

Associated with the conveyor 105 is a seam aligning mechanism which mechanism is substantially the same as that shown in the copending application of Sheldon Dill Cooper, filed March 1, 1930, Serial No. 432,509 for Method and apparatus for handling bent metal. The conveyor 105 includes a plurality of transversely extending hyperbolic rolls 108 and a plurality of cylindrical rolls 109 the axis of the latter being disposed longitudinally of the conveyor. These latter rolls 109 serve to rotate the open seamed pipe about its longitudinal axis while the rolls 108 serve to propel the pipe forwardly toward the welding machine. A plurality of vertical movable slides 110 are mounted in brackets 111. These slides are of a width substantially less than the width of the open seam and after the pipe assumes a position with its upper seam at the top, the slides 110 drop into the seam and prevent further rotation of the pipe about its longitudinal axis, the rolls 109 slipping or sliding on the underneath surface of the pipes. The hyperbolic rolls 108 propel the pipe axially forward with the open seam in alignment with the fins 92 on the line-up rolls 91.

All of the power driven rolls shown associated with the welding machine are driven from a suitable motor 115 through suitable gear reduction devices carried by a shaft 116.

The pipe as it passes into the welding machine is first engaged by the line-up rolls 91 with the fins 92 on the top roll of the line-up rolls extending through the open seam. From the line-up rolls the pipe is received by the feed rolls 93 which serve to pass the pipe through the welding machine. As the open seamed pipe passes through the welding throat electric current is applied to the electrodes 87'. Upon entering the electrodes the seam of the pipe is normally open but at the point of contact between the pipe and the electrodes the seam is closed by the pressure of the pressure rolls under the electrodes and simultaneously therewith the abutting edges of the seam are welded.

The method of welding followed, as disclosed in the application, is primarily a resistance method wherein the surface of the circular electrode rolls contact with a relatively small portion of the pipe on each side of the seam as it is brought in contact therewith. I do not wish to be limited to resistance methods of welding for various other methods now in common use may be employed in this step.

Associated with the welding machine rearwardly of the planishing rolls 94 are a plurality of stands of shaping or sizing rolls. Four stands of these sizing rolls are designated at 117, 118, 119, and 120. Each stand of rolls includes three hyperbolic rolls each of which acts upon the outer surface of the welded pipe throughout an arc of substantially 120 degrees. These rolls are in effect shaping or sizing rolls for shaping the pipe to cylindrical form. When the pipe issues from the planishing rolls 94 the seam is more or less flat and consequently the pipe at the rear side of the planishing rolls is not in the form of a true cylinder. The four stands of sizing rolls shape the pipe to cylindrical form and round out the flat portions.

*Normalizing furnace and hot beds, Figures 12 and 13*

The shaping of the flat rolled metal from substantially flat to tubular form is essentially a cold rolling process, disregarding, of course, the heat of resistance applied by the electrodes at the seam. Where sheet material of high carbon content is employed certain stresses sometimes accompanied by corresponding strains become inherent in the walls of the pipe. In order to remove any stresses, set up in the pipe by this process and which might weaken the same together with any strains caused thereby, a normalizing furnace of the standard walking beam type and a cooling bed is provided for cooling the pipes after they have been removed from the furnace.

Referring now to the drawings, a handling table is designated at 121. This table includes a run-out conveyor 122 and similar to the conveyor 97, employed as a run-out conveyor from the forming machine shown in Figure 9. This conveyor is driven from a plurality of motors 123 in the manner shown in this last mentioned figure. A plurality of conveyors 124 similar to the conveyors 102 shown in Figure 9 are provided for carrying the pipes transversely and depositing them on a longitudinal conveyor 125. The conveyors 124 are driven from motors 126 while the conveyor 125 is driven by means of motor 127. From the conveyor 125 the tubes are carried longitudinally to a normalizing furnace kickoff table 128 having a conveyor 129 associated therewith. A plurality of pick-up devices in the form of cradle arms 130 secured on a horizontal shaft 131 driven by a motor 132 through a suitable gearing arrangement, serves to pick up the pipes on the conveyor 128 and places them on the walking beams of the normalizing furnace 133, being propelled by the walking beams of this furnace (not shown). These pipes are ejected onto a run-out table 134 having a conveyor 135 associated therewith. This conveyor is similar to the conveyor 125 and serves to carry the pipes to a cooling bed 136. This cooling bed is in the form of a table having a plurality of skids 137 across which the pipes pass transversely and are deposited on a conveyor 138 driven through suitable driving mechanism 139. While passing over the cooling bed the pipes become evenly cooled.

As is shown in Fig. 1, the welded pipes may be conveyed or bypassed around the furnace if desired.

It will be noted here that the conveyor and handling apparatus move the welded pipe from the welder to beyond (either thru or around) the furnace, all in substantially the same horizontal plane in which the plate traveled. In fact the entire conveyor and handling system maintains the plate, the formed pipe and the welded pipe in about the same horizontal plane and at about the same distance above the floor at all times, so that, without manual handling or the use of cranes a plate may be converted into finished pipe without ever having been more than a few feet above the floor or materially outside of one horizontal plane.

The straightening machine, the sawing machine, and the testing machine, Figures 14 and 15

This conveyor 138 which receives the pipes from the cooling bed serves to feed the pipes into a straightening machine shown in Figure 14 which straightening machine is designated at 140. The straightening machine consists in a frame work 141 carrying straightening rolls 142 suitably driven by means of a motor 143.

From this straightening machine 140 the pipe is received by a conveyor 143' similar to the conveyors 97 and 125 and suitably driven by a motor 144. A plurality of pick-up devices 146 similar to the pick-up devices 130 serve to remove the pipes from the conveyor 143' and place them on a gravity table 144' down which the pipes roll to the conveyor 145 of the same general type as the conveyor 143'. The conveyor 145 moves the pipe into operative relation with respect to the saw 146 forming a part of the sawing machine 147. This sawing machine comprises a stationary portion 148 and a movable portion 149, which travels back and forth laterally of the plant as indicated by the arrows in Figure 14 to crop off one end of the pipe. The end portion of the pipe which is cropped off consists in a section of the pipe which has been welded by the welding machine and also at the extreme end of the pipe which has not been welded as described in connection with the welding machine. This cropped off portion of the pipe is subjected to a testing machine in the form of a crusher 150. The section of the pipe cropped off is reduced to elliptical shape having a minor axis substantially equal to one half the diameter of the pipe and if there is no rupture of the seam in this test the pipe is allowed to move to a conveyor 151 by means of pick-up tables 152. The rollers of this conveyor move the pipe in a direction opposite to the direction imparted to the pipe by conveyor 145 and in so doing the opposite end of the pipe is brought into operative relation with respect to a saw 153, carried by a sawing machine 154 similar to the machine 147. This latter cropped off end is also subjected to the testing machine 150 and if this end of the pipe withstands the test a plurality of cradle arms 155 places the pipe on skids 156 which convey the same to a conveyor 157 similar to the other forms of conveyors such as the conveyor 154' which are used as standard equipment throughout the conveyor system.

Facing machine and threading machine, Figures 16 and 17

The conveyor 157 shown in Figure 14 is comparatively long and is shown extended into Figure 16. A plurality of cradle arms 158, mounted on a shaft 159, driven by a motor 160, removes the pipes from the conveyor 157, places them on skids 161 and conducts them one at a time onto a table 162 in alignment with a pair of facing machines 163 and 164 on opposite sides of the table 162. These facing machines are of the type disclosed in my co-pending application, Serial No. 470,684, filed July 25, 1930. The facing machines 163 and 164 are each provided with operating portions 166, which advance inwardly on the ends of the pipes to face the same. Subsequently these operating portions 166 are retracted simultaneously and a plurality of cradle arms 167 mounted on a shaft 168 driven by a motor 169 removes the pipes from the table 162 and places them on skids 170 from which they are conducted to a conveyor 171. This conveyor 171 is also of the standard type employed throughout the conveyor system and serves to move one end of the pipe in operative relation with respect to the threading machine 172. This threading machine is of the standard type and it is believed sufficient to state that the machine threads one end of the pipe and ejects the pipes. From the conveyor 171 cradle arms 173 similar to the cradle arms 158 and 167 remove the pipe and place the same in a conveyor 179 which bears the same in operative relation to a threading machine 180 that the conveyor 171 bears to the threading machine 172. This conveyor 179 moves the pipe into the machine 180 to thread the same. Upon ejection of the pipe by the threading machine 180, the pipe is carried on transverse skids 181 to a longitudinal conveyor 182 of the same type as the conveyor 157.

Coupling machine, hydrostatic testing machine and weighing machine, Figure 18

The conveyor 182 shown in Figure 16 is continued into Figure 18. From this conveyor 182 the pipes are engaged by cradle arms 183 on a common shaft 184 and are conducted on skids 185 to the conveyor 186. One end of the threaded pipe is acted upon while in this conveyor 186 by a coupling machine 187 and a standard coupling, which for example may be of the type employed in coupling pipe sections of an oil well, is applied to one threaded end of the pipe.

From the conveyor 186 the pipes are acted upon by cradle arms 188 similar to the cradle arms 183 and are carried on skids 189 onto a conveyor table 190. Here the pipes are subjected to an internal test of approximately 1500 pounds per square inch and to a corresponding external test.

The machine for accomplishing this test serves to detect pin holes or other defects in the pipes and rejected pipes may be discarded at this stage of the process.

From the testing machine 191 the pipes roll on skids 192 to a table 193 upon which they are weighed by means of scales 194, to determine their relative value. After the weighing operation the pipes are conducted to a conveyor 195 on skids 196. This conveyor 195 aligns the pipes with a drying furnace 197 (Fig. 21). The conveyor 195 is driven by a motor 198 which feeds the pipes into the furnace 197 and through this furnace into a paint machine 200, from which paint machine the pipes are ejected onto a conveyor 199 in finished marketable condition. From the conveyor 199 the pipes are moved to tables where they are inspected, measured and numbered.

Although various changes, alterations and modifications in the foregoing apparatus and method practiced herein may be suggested by those skilled in the art without involving invention, all such changes, alterations and additions fall within the scope and spirit of this invention as claimed herein.

I claim:

1. Apparatus for making pipe which includes means for shearing the longitudinal edges of an elongated piece of ferrous metal to provide clean surfaces to be welded together, means for cleaning one surface of said piece along its sheared side edges, means for forming the piece progressively from end to end into a substantially straight pipe blank having a longitudinally extending seam gap and having the cleaned surfaces on the outside thereof, and means including roller electrodes engageable with said cleaned surfaces for electric resistance butt welding together the sheared seam edges of such a pipe blank progressively from end to end and thruout substantially their entire radial and longitudinal dimensions.

2. Apparatus for making pipe which includes means for shearing the longitudinal edges of an elongated piece of ferrous metal to provide clean surfaces to be welded together, means for cleaning one surface of said piece along its sheared side edges, means for forming the thus cleaned metal progressively from end to end into a substantially straight large diameter pipe blank having a longitudinally extending seam gap and having the cleaned surface on the exterior thereof, means including rotary electrodes engageable with said cleaned surfaces for electric resistance butt welding together the sheared seam edges of the blank progressively from end to end and thruout substantially their entire radial and longitudinal dimensions, and means for relieving internal strains set up in the pipe during welding.

3. Apparatus for making pipe which includes means for shearing the longitudinal edges of an elongated, thick, flat, wide piece of ferrous metal, means for cleaning one surface of said metal near its longitudinal edges, and conveyor and handling means disposed between the shearing and cleaning means adapted to receive the said plate in a horizontal plane and to tilt it and pass it in tilted position thru the cleaning means to expose the edge portions of the under side of the metal to a cleaning action, and conveyor and handling means beyond the cleaning means adapted to receive a plate in tilted position from the cleaning means and to deliver it in a horizontal plane to a subsequent instrumentality.

WILLIAM M. NECKERMAN.